(12) United States Patent
Moss et al.

(10) Patent No.: US 10,396,869 B2
(45) Date of Patent: Aug. 27, 2019

(54) TRANSMISSION TECHNIQUES

(71) Applicant: British Broadcasting Corporation, London (GB)

(72) Inventors: Peter Neil Moss, London (GB); Adam Wiewiorka, London (GB)

(73) Assignee: British Broadcasting Corporation, London (GB)

( * ) Notice: Subject to any disclaimer, the term of this patent is extended or adjusted under 35 U.S.C. 154(b) by 0 days.

(21) Appl. No.: 15/850,347

(22) Filed: Dec. 21, 2017

(65) Prior Publication Data

US 2018/0115352 A1   Apr. 26, 2018

Related U.S. Application Data

(63) Continuation of application No. 14/888,838, filed as application No. PCT/GB2014/051464 on May 13, 2014, now abandoned.

(30) Foreign Application Priority Data

May 13, 2013 (GB) .................................. 308534.5

(51) Int. Cl.
*H04B 7/0456* (2017.01)
*H04B 7/0413* (2017.01)
*H04B 7/10* (2017.01)

(52) U.S. Cl.
CPC ......... *H04B 7/0456* (2013.01); *H04B 7/0413* (2013.01); *H04B 7/10* (2013.01)

(58) Field of Classification Search
CPC ....... H04B 7/0456; H04B 7/0413; H04B 7/10

USPC ................................................. 375/260, 267
See application file for complete search history.

(56) References Cited

U.S. PATENT DOCUMENTS

| | | | |
|---|---|---|---|
| 7,672,384 B2 | 3/2010 | Giannakis et al. | |
| 8,964,871 B2 | 2/2015 | Mobasher et al. | |
| 2006/0039489 A1* | 2/2006 | Ikram ................. | H04B 7/0634 |
| | | | 375/260 |
| 2011/0080901 A1 | 4/2011 | Lin et al. | |
| 2011/0211628 A1 | 9/2011 | Hammarwall et al. | |
| 2013/0272448 A1 | 10/2013 | Moon et al. | |
| 2016/0065277 A1 | 3/2016 | Moss et al. | |

FOREIGN PATENT DOCUMENTS

| | | |
|---|---|---|
| CN | 101729214 B | 9/2013 |
| KR | 20100056304 A | 5/2010 |
| WO | WO 2007/139325 A1 | 12/2007 |

(Continued)

OTHER PUBLICATIONS

International Search Report, PCT/GB2014/051464, dated Oct. 29, 2014, 6 pages.

(Continued)

*Primary Examiner* — Chieh M Fan
*Assistant Examiner* — Fitwi Y Hailegiorgis
(74) *Attorney, Agent, or Firm* — Daly, Crowley Mofford & Durkee, LLP

(57) ABSTRACT

Methods and apparatus for processing an OFDM MIMO signal in a system having at least two transmitters arranged to transmit an output signal pair that includes operating a series of transformations on a pair of input signals so that each stream of the output signal pair contains decodable information from both streams of the input signal pair.

9 Claims, 3 Drawing Sheets

(56) References Cited

FOREIGN PATENT DOCUMENTS

| WO | WO 2009/072960 A | 6/2009 |
|---|---|---|
| WO | WO 2009/113766 A | 9/2009 |
| WO | WO 2010/021471 A2 | 2/2010 |
| WO | WO 2012/014064 A2 | 2/2012 |
| WO | WO 2012/081870 A2 | 6/2012 |

OTHER PUBLICATIONS

Search Report dated Nov. 14, 2013 in Application No. GB1308534.5, 5 pages.
Combined Search and Examination Report dated Oct. 30, 2014 in Application No. GB1408475.0, 4 pages.
Notification of Transmittal of the International Search Report and the Written Opinion of the International Searching Authority, or the Declaration, PCT/GB2014/051464, dated Oct. 29, 2014, 18 pages.
Peter Moss, MIMO Technology in Broadcasting—and an application in Programme-making, $2^{nd}$ IEEE BTS Gold Workshop, Mar. 4-5, 2013, Cagliari, 58 pages.
Love, D.J.: Heath, R.W., "Limited Feedback Unitary Precoding for Spatial Multiplexing Systems," Information Theory, IEEE Transactions on Information Theory, vol. 51, No. 8, pp. 2967-2976, Aug. 2005, 10 pages.
Interdigital Communications et al.: "MU-MIMO Codebook Selection and Signaling Considerations for E-UTRA", 3GPP Draft; R1-074702, $3^{rd}$ Generation Partnership Project (3GPP), Mobile Competence Centre; 650, Route Des Lucioles; F-06921 Sophia-Antipolis Cedex; France, vol. RAN WG1, No. Korea; Oct. 30, 2007, Oct. 30, 2007, XP050108177. 12 pages.
U.S. Restriction Requirement dated Sep. 15, 2016 corresponding to U.S. Appl. No. 14/888,838; 6 Pages.
Response to Restriction Requirement dated Sep. 15, 2016 corresponding to U.S. Appl. No. 14/888,838; Response filed on Oct. 17, 2016; 6 Pages.
U.S. Non-Final Office Action dated Nov. 25, 2016 corresponding to U.S. Appl. No. 14/888,838; 12 Pages.
Response to U.S. Non-Final Office Action dated Nov. 25, 2016 corresponding to U.S. Appl. No. 14/888,838; Response filed on May 15, 2017; 13 Pages.
U.S. Final Office Action dated Sep. 22, 2017 corresponding to U.S. Appl. No. 14/888,838; 9 Pages.

* cited by examiner

TRANSMISSION TECHNIQUES

CROSS REFERENCE TO RELATED APPLICATIONS

This application is a continuation application of U.S. patent application Ser. No. 14/888,838 filed Nov. 3, 2015, and entitled "PRECODING TECHNIQUES FOR OPTIMIZED CHANNEL CAPACITY IN MIMO SYSTEMS", which is a U.S. National Stage of PCT application PCT/GB2014/051464 filed in the English language on May 13, 2014, and entitled "PRECODING TECHNIQUES FOR OPTIMIZED CHANNEL CAPACITY IN MIMO SYSTEMS," which claims priority to UK application GB1308534.5 filed May 13, 2013 which applications are each hereby incorporated herein by reference in their entireties.

FIELD OF THE INVENTION

This invention relates to a method and apparatus for transmitting MIMO and/or OFDM signals as typically used in the context of digital television distribution and programme-making.

BACKGROUND OF THE INVENTION

Digital television signals are defined in various standards which we will refer to as the DVB standards. This includes DVB, DVB-T2 and newer standards such as DVB-NGH. The DVB-NGH standard DVB Document A160 "Next Generation broadcasting system to Handheld physical layer specification" relates particularly to handheld terminals for receiving digital terrestrial and hybrid (combination of terrestrial with satellite transmissions).

OFDM-MIMO systems are described more generally in our own earlier European Patent EP1821481 which describes an OFDM-MIMO system in the form of a DVB-T system with modifications to the standard DVB-T transmission signal that allow the receiver to have knowledge of the resulting 2-by-2 matrix channel. Our own earlier United Kingdom Patent GB2449858 describes further improvements to OFDM using cyclic delay diversity in which a cyclic delay may be applied to OFDM carriers in a manner such that the apparent delay varies as a function of frequency across the spectrum. OFDM and MIMO are known to the skilled person, particularly in the context of digital television, but will be described briefly here for ease of reference later.

OFDM

COFDM (coded orthogonal frequency-division multiplex) techniques can be used for the transmission of any digital information. In brief, in COFDM, data is divided between a large number of (typically more than a thousand) closely-spaced carriers. This explains the 'Frequency Division Multiplex' part of the name COFDM. Only a small amount of the data is carried on each carrier, and this significantly reduces the influence of intersymbol interference.

The distribution of the data over the many carriers means that selective fading will cause some bits to be received in error while others are received correctly. By using an error-correcting code, which adds extra data bits at the transmitter, it is possible to correct many or all of the bits which were incorrectly received. The information carried by one of the degraded carriers is corrected because other information, which is related to it by the error correction code, is transmitted in a different part of the multiplex (and, it is hoped, would not suffer the same deep fade). This explains the 'Coded' part of the name COFDM.

The 'Orthogonal' part of the COFDM name indicates that there is a precise mathematical relationship between the frequencies of the carriers in the system.

The receiver acts as a bank of demodulators, translating each carrier down to dc, the resulting signal then being integrated over a symbol period to recover the raw data. If the other carriers all beat down to frequencies which, in the time domain, have a whole number of cycles in the symbol period (t), then the integration process results in zero contribution from all these other carriers. Thus, the carriers are linearly independent (i.e. orthogonal) if the carrier spacing is a multiple of 1/t.

The process of creating an OFDM signal may be summarised by the following steps.

A serial digital signal comprising a bit stream is converted into a plurality of parallel bit streams. Using a chosen modulation scheme, such as Binary Phase-Shift Keying (BPSK) or Quadrature Amplitude Modulation (QAM) the parallel bit streams are mapped to a plurality of subcarriers. BPSK modulates one bit per carrier, in 4-QAM there 4 are carrier states of equal magnitude each separated by 90 degrees and so this modulation scheme can carry 2 bits on each carrier. With higher order levels of QAM more bits per carrier may be modulated.

The plurality of modulated carriers are chosen to have a frequency spacing that is the inverse of the active symbol period over which the receiver will examine the signal. It is the choice of carrier spacing in relation to the active symbol period that ensures the orthogonality of the carriers. At the receiver the demodulator for one carrier does not "see" the modulation of others.

The original input bit streams which are now mapped onto carriers can be thought of as frequency coefficients. Performing a Fourier transform on frequency coefficients transforms a frequency domain signal to a time domain signal (a signal varying in amplitude with time). Accordingly, the bit stream data representing the modulation onto groups of modulated carriers is fed to an Inverse Fast Fourier Transform (IFFT) block which transforms the data into a time domain modulated signal comprising symbols, with groups of symbols arranged into frames with appropriate guard intervals between the symbols. Each symbol results from one set of modulated sub-carriers.

The "frequency" of symbols within an OFDM signal is typically described as that of either the lowest carrier or the centre carrier in the set of carriers used. In reality, of course, the OFDM signal is a signal varying in amplitude with time that is formed from the plurality of carriers, as described above. It is useful, though, to describe the "frequency" of a symbol in this way, particularly in the context of DVB signals.

MIMO

Methods of delivering digital wireless television have been proposed which use Multiple-Input Multiple-Output (MIMO) techniques to allow dual transmission streams to be transmitted. In a typical basic system there are two transmit antennas and two receive antennas, with associated transmitters and receivers. Such a system can deliver up to twice the throughput of conventional Single-Input Single-Output (SISO) systems, whilst requiring no additional spectrum. More generally MIMO refers to a radio link employing at least two (two or more) transmitters and two or more receivers.

SUMMARY OF THE INVENTION

We have appreciated that improvements can be made to MIMO and to OFDM signals (whether with MIMO, or without). In particular, we have appreciated that techniques developed for DVB standards can be extended to improve channel capacity.

The invention in its various aspects is defined in the independent claims below, to which reference should now be made. Advantageous features are set forth in the appendant claims.

The invention may be applied to MIMO systems for which an equivalent channel of lower dimensionality than the physical dimensionality is sufficient to describe the equivalent transmit-receive paths. In such systems, due to the inclusion of repeated data, a channel of greater physical dimensionality may be described as an equivalent channel of lower dimensionality. In this regard, the physical dimensionality includes the both the number of transmitters and the number of receivers. For example, a 4×2 channel adopts a 2×2 mathematical description. The preferred arrangement is in the context of a 4-transmit 2-receive (4×2) MIMO structure where two pairs of transmit antennas are fed with the same source data (two streams), but distinctly pre-coded by a matrix pair (G,M).

A first aspect relates to improvements to MIMO techniques. In broad terms, a method of deriving precoding matrices for a MIMO signal is provided. The method comprises maximising a function of the channel capacity over values of precoding matrices and a set of channel realisations so as to obtain optimum precoding matrices. The channel realisations may be models derived from assumed matrices (G,M) through a complex channel measure which is allowed to adopt a set of values. As part of the process of deriving the precoding matrices, they are preferably constrained to be unitary. This constrains the system output power to a fixed value.

Variations within the first aspect are provided. In a first variant of the first aspect, the optimisation comprises deriving a measure of channel capacity based on standard MIMO channel capacity formula, determining the value of a complex channel measure yielding the lowest channel capacity for a given precoding matrix pair (G, M), drawn from a set of candidate values of matrices (G,M) then selecting the particular precoding matrices from that set that maximise the minimum channel capacity.

In a second variant of the first aspect, the optimisation comprises deriving a measure of channel capacity based on standard MIMO channel capacity formula, selecting a set of values of a complex channel measure from a probability distribution, determining the mean of the channel capacity over the selected set of values of complex channel measure, and selecting the precoding matrices that maximise the mean channel capacity.

The first aspect of the invention may be applies to a variety of MIMO systems, including, but not limited to, DVB, DVB-T2, DVB-NGH as well as to non DVB systems. Such MIMO systems may use various antenna techniques including linear and circular polarisation.

A second aspect of the invention relates to improvements to OFDM techniques. In broad terms, new phase rotation techniques to be applied across OFDM sub-carriers are provided.

In the second aspect, a method of processing an OFDM MIMO signal is provided comprising a series of transformations including: a carrier index dependent complex rotation of one of the transmit signal pairs; a real 2×2 rotation matrix acting across the MIMO pair; and a further index dependent complex rotation of the one of the transmit signal pairs but with a different complex rotation angle.

Cyclic delay diversity may be applied in this second aspect by a method of processing an OFDM signal in a system having a plurality of carriers, comprising introducing a complex phase rotation as a function of carrier index.

The first and second aspects in each of the variants may be used in combination with one another.

BRIEF DESCRIPTION OF THE FIGURES

Embodiments of the invention will now be described by way of example only and with reference to the figures, in which.

DESCRIPTION OF A PREFERRED EMBODIMENT

The invention in its various aspects may be embodied in methods of determining parameters for transmission signals, such as pre-coding matrices, methods of transmitting signals, transmitters, methods of receiving, receivers and systems.

Figure 1:
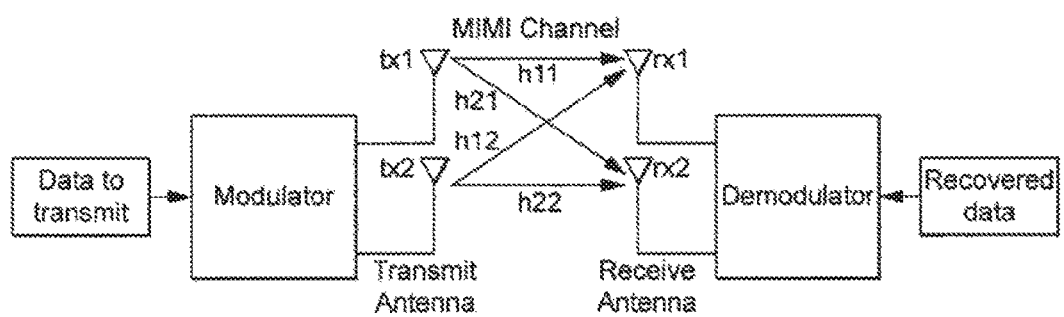
FIG. 1: is a schematic diagram of a basic MIMO arrangement that may be used in an embodiment of the invention.
Figure 2:
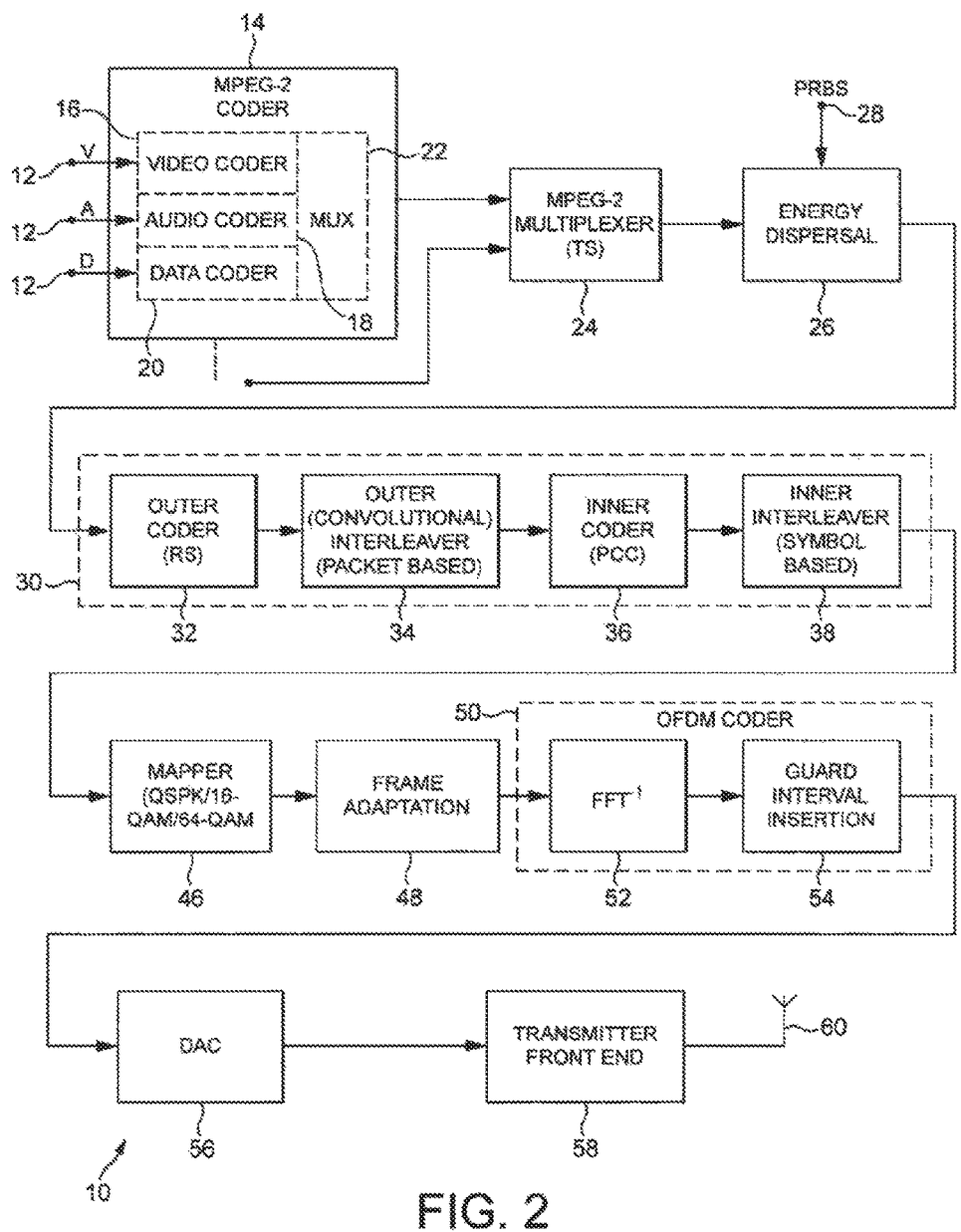
FIG. 2: is a schematic block diagram of a known DVB transmitter that may embody the present invention.
Figure 3:
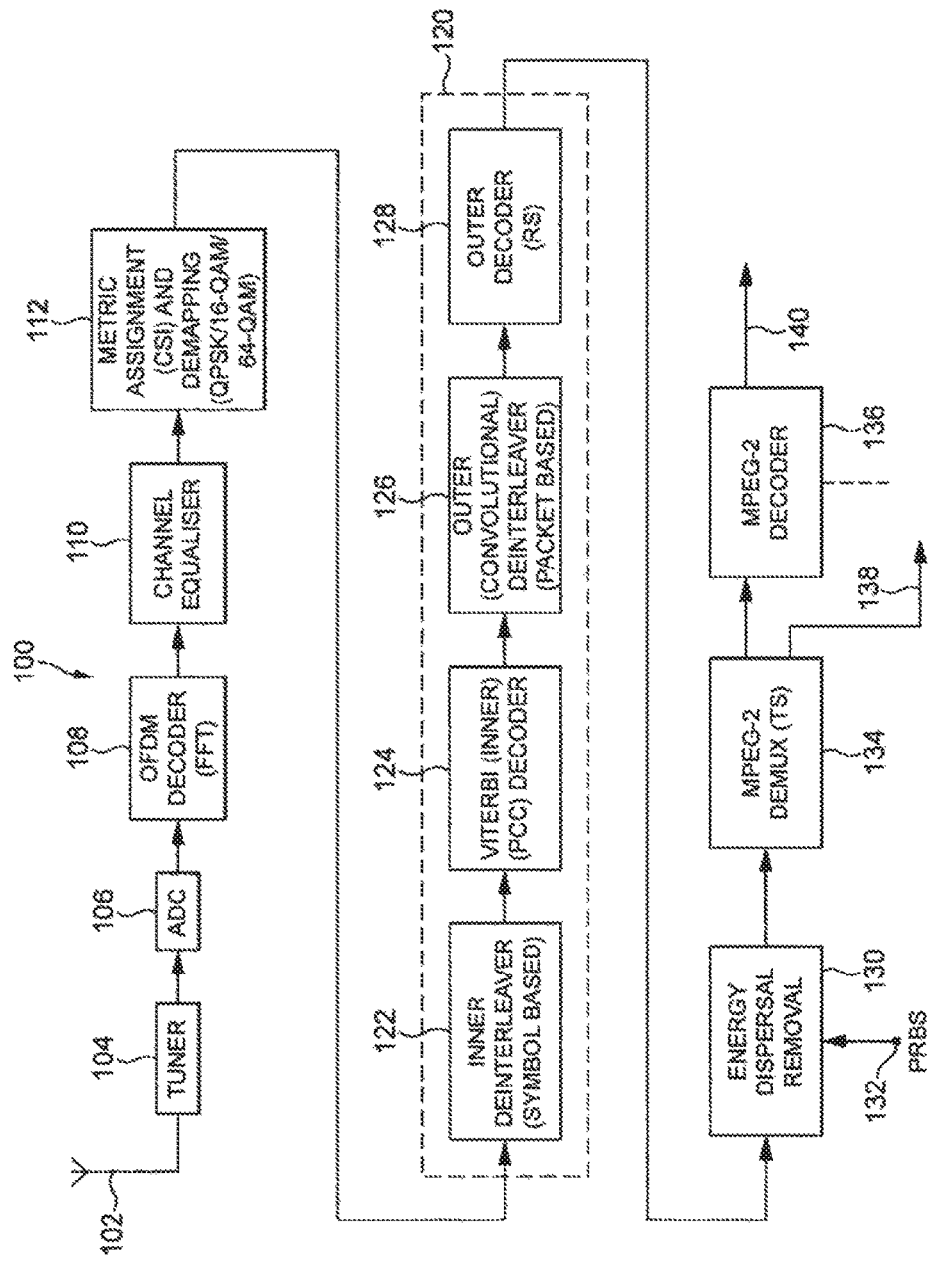
FIG. 3: is a schematic block diagram of a known DVB receiver that may embody the present invention.

To enable an understanding of the present invention a description of a MIMO system will first be set out with reference to FIG. 1, followed by the principles of a DVB-T transmitter and receiver with reference to FIGS. 2 and 3. The invention in its various aspects may be embodied in such systems. It is noted, though, that the invention may be embodied in systems other than those related to the DVB standards, but for convenience of description may be considered as embodied in a system with transmitter and receiver of the type shown in FIGS. 1, 2 and 3.

MIMO System

Multiple antenna system, Multiple-Input Multiple-Output (MIMO), is an emerging wireless technology that uses multiple transmit and multiple receive antennas to increase the data throughput.

The MIMO system shown in FIG. 1 uses two transmit and two receive antennas, normally referred to as a 2×2 MIMO system. The first number refers to the number of transmit antennas, and the second number to the number of receive antennas. Thus, 4×4 MIMO system has 4 transmit and 4 receive antennas, a 4×2 MIMO system has 4 transmit and 2 receive antennas, and so on.

The system can be represented by a general equation $$y = Hx + n$$

where y is the received vector of size $m_r$, H is the $m_r \times m_t$ complex channel matrix, x is the vector of $m_t$ transmitted symbols chosen from a complex constellation D, and n is the additive white Gaussian noise (AWGN) vector of size $m_r$ added to the system.

The received vector y ($y_1$ and $y_2$) can be written in matrix form $$\begin{bmatrix} y_1 \\ y_2 \end{bmatrix} = \begin{bmatrix} h_{11} & h_{12} \\ h_{21} & h_{22} \end{bmatrix} \begin{bmatrix} x_1 \\ x_2 \end{bmatrix} + \begin{bmatrix} n_1 \\ n_2 \end{bmatrix}$$

where $x_1$ and $x_2$ are the transmitted symbols from transmitter 1 and transmitter 2 respectively, while $n_1$ and $n_2$ are the noise added to receiver 1 and receiver 2 respectively.

In the system shown in FIG. 1, two distinct data streams may be sent (one from each antenna). In an 4×4 MIMO scheme, four distinct streams may be carried, and so on. Alternatively, additional diversity may be provided by providing fewer distinct streams than the number of antennas. For example, in the known "halfRF" camera system of the applicant, two distinct streams are carried over 4 transmit antennas providing a so called "rate 2" MIMO scheme.

DVB-T Transmitter

FIG. 2 is a block diagram of a transmitter 10 for use in the Digital Video Broadcasting standard for Terrestrial television (DVB-T) as defined in European Telecommunication Standard ETS 300 744 (hereinafter "the standard"). Reference should be made to that standard for further details; the following description is by way of a summary for the purpose of illustrating the present invention.

The transmitter receives video (V), audio (A), and data (D) signals from appropriate signal sources via inputs 12 and these are applied to an MPEG-2 coder 14. The MPEG-2 coder includes a separate video coder 16, audio coder 18 and data coder 20, which provide packetised elementary streams which are multiplexed in a programme multiplexer 22. Signals are obtained in this way for different programmes, that is to say broadcast channels, and these are multiplexed into a transport stream in a transport stream multiplexer 24. Although considered as part of the transmitter for the purposes of this specification, the components up to the multiplexer 24 will normally be located at the studio complex. The output of the transport stream multiplexer 24 consists of packets of 188 bytes and is applied to a randomiser 26 for energy dispersal, where the signal is combined with the output of a pseudo-random binary sequence (PRBS) generator received at a terminal 28. The randomiser more evenly distributes the energy within the RF (radio frequency) channel. The MPEG-2 coding and multiplexing and the randomising are not further described as they are not relevant to an understanding of the present invention.

The signal is now applied to a channel coding section 30 which is generally known as the forward error corrector (FEC) and which comprises four main components, namely: an outer coder 32, an outer interleaver 34, an inner coder 36, and an inner interleaver 38. These will now be described. The two coding stages 32,36 provide a degree of redundancy to enable error correction at the receiver. The two interleaving stages 34,38 are necessary precursors for corresponding deinterleavers at a receiver so as to break up bursts of errors so as to allow the error correction to be more effective.

The outer coder 32 is a Reed-Solomon (RS) coder, which processes the signal in packets of 188 bytes and adds to each packet 16 error protection bytes. This allows the correction of up to 8 random erroneous bytes in a received word of 204 bytes. This is known as a (204, 188, t=8) Reed-Solomon code. This is achieved as a shortened code using an RS (255, 239, t=8) encoder but with the first 51 bytes being set to zero.

The outer interleaver 34 effects a Forney convolutional interleaving operation on a byte-wise basis within the packet structure, and spreads burst errors introduced by the transmission channel over a longer time so they are less likely to exceed the capacity of the RS coding. After the interleaver, the nth byte of a packet remains in the nth byte position, but it will usually be in a different packet. The bytes are spread successively over 12 packets, so the first byte of an input packet goes into the first output packet, the second byte of the input packet is transmitted in the second output packet, and so on up to the twelfth. The next byte goes into the first packet again, and every twelfth byte after that. As a packet contains 204 bytes, and 204=12×17, after the outer interleaving a packet contains 17 bytes that come from the same original packet.

The inner coder 36 is a punctured convolutional coder (PCC). The system allows for a range of punctured convolutional codes, based on a mother convolutional code of rate ½ with 64 states.

The inner interleaver 38 in accordance with the standard is implemented as a two-stage process, namely bit-wise interleaving followed by symbol interleaving. Both are block based. First, however, the incoming bit stream is divided into 2, 4 or 6 sub-streams, depending on whether QPSK (quadrature phase shift keying), 16-QAM (quadrature amplitude modulation), or 64-QAM is to be used, as described below. Each sub-stream is separately bit interleaved and all the streams are then symbol interleaved.

The bit interleaver uses a bit interleaving block size which corresponds to one-twelfth of an OFDM symbol of useful data in the 2 k mode and ⅛ of an OFDM symbol in the 8 k mode. These two modes are explained below.

The symbol interleaver maps the 2, 4 or 6-bit words onto 1512 or 6048 active carriers, depending on whether the 2 k or 8 k mode is in use. The symbol interleaver acts so as to shuffle groups of 2, 4 or 6 bits around within the symbol. This it does by writing the symbol into memory and reading out the groups of 2, 4 or 6 bits in a different and permuted order compared with the order in which they were written into the memory.

Finally the groups of 2, 4 or 6 bits are applied to a mapper 46 which quadrature modulates the bits according to QPSK, 16-QAM or 64-QAM modulation, depending on the mode in use. (QPSK may also be represented as 4-QAM.) The constellations are shown in FIG. 9 of the standard. It will be appreciated that this requires 1, 2 or 3 bits on the X axis and 1, 2 or 3 bits on the Y axis. Thus while reference has been made to 2, 4 or 6 bits in the shuffling process, in fact the shuffling is applied to 1, 2 or 3 bits in the real part and 1, 2 or 3 bits in the imaginary part.

The signal is now organized into frames in a frame adapter 48 and applied to an OFDM (orthogonal frequency-division multiplexer) coder 50. Each frame consists of 68 OFDM symbols. Each symbol is constituted by 1705 carriers in 2 k mode or 6817 carriers in 8 k mode. Using the 2 k mode as an example, instead of transmitting 1705 bits sequentially on a single carrier, they are assembled and transmitted simultaneously on 1705 carriers. This means that each bit can be transmitted for much longer, which, together with the use of a guard interval, avoids the effect of multipath interference and, at least in 8 k mode, allows the creation of a single-frequency network.

The duration of each symbol, the symbol period, is made up of an active or useful symbol period, and the guard interval. The spacing between adjacent carriers is the reciprocal of the active symbol period, thus satisfying the condition for orthogonality between the carriers. The guard interval is a predefined fraction of the active symbol period, and contains a cyclic continuation of the active symbol.

The predefined fractions are ¼, ⅛, 1/16 and 1/32. The total symbol duration is of the order of 250 microsecond for the 2 k mode and 1 ms for the 8 k mode.

The OFDM coder 50 consists essentially of an inverse fast Fourier transform (FFT) circuit 52, and a guard interval inserter circuit 54. The construction of the OFDM coder will be known to those skilled in the art.

Reference is made to British Broadcasting Corporation Research and Development Report BBC RD 1996/8, P. Shelswell, "The COFDM Modulation System" with regard to OFDM generally, and to a paper by Stott, J. H., 1997, "Explaining some of the Magic of COFDM", Proceedings of the 20th International Symposium, Montreux 1997, pages 341 to 350, which describes how the various components of the forward error corrector co-operate with the OFDM coder to provide a very advantageous coding system.

Finally, the signal is applied to a digital to analogue converter 56 and thence to a transmitter 'front end' 58, including the transmitter power amplifier, and is radiated at radio frequency from an antenna 60.

DVB-T Receiver

The receiver construction includes components corresponding to those in the transmitter but in reverse order. A generalised DVB-T receiver 100 is illustrated in simplified form in the block diagram of FIG. 3, with some elements which are not of particular relevance to the present invention omitted.

In the receiver 100 an analogue RF signal is received by an antenna 102 and applied to a tuner or down-converter 104, constituting the receiver front end, where it is reduced to baseband. The signal from the tuner is applied to an analogue-to-digital converter 106, the output of which forms the input to an OFDM decoder 108. The main constituent of the OFDM decoder is a fast Fourier transform (FFT) circuit, to which the FFT in the transmitter is the inverse. The FFT receives the many-carrier transmitted signal with one bit per symbol period on each carrier and converts this back into a single signal with many bits per symbol period. The existence of the guard interval, coupled with the relatively low symbol rate compared with the total bit rate being transmitted, renders the decoder highly resistant to multipath distortion or interference.

Appropriate synchronisation is provided, as is well-known to those skilled in the art. In particular, a synchronising circuit will receive inputs from the ADC 106 and the FFT 108, and will provide outputs to the FFT and, for automatic frequency control, to the tuner 104.

The output of the OFDM decoder 108 is then applied to a channel equalizer 110. This estimates the channel frequency response, then divides the input signal by the estimated response, to output an equalised constellation.

Now the signal is applied to a circuit 112 which combines the functions of measurement of channel state, and demodulation or demapping of the quadrature modulated constellations. The demodulation converts the signal back from QPSK, 16-QAM, or 64-QAM to a simple data stream, by selecting the nominal constellation points which are nearest to the actual constellation points received; these may have suffered some distortion in the transmission channel. At the same time the circuit 112 estimates the likelihood or level of certainty that the decoded constellation points do in fact represent the points they have been interpreted as. As a result a likelihood or confidence value is assigned to each of the decoded bits.

The output of the metric assignment and demapping circuit 112 is now applied to an error corrector block 120 which makes use of the redundancy which was introduced in the forward error corrector 30 in the transmitter. The error corrector block 120 comprises: an inner deinterleaver 122, an inner decoder 124, in the form of a soft-decision Viterbi decoder, an outer deinterleaver 126, and an outer decoder 128.

The inner deinterleaver 122 provides symbol-based deinterleaving which simply reverses that which was introduced in the inner interleaver 38 in the transmitter. This tends to spread bursts of errors so that they are better corrected by the Viterbi decoder 124. The inner deinterleaver first shuffles the groups of 2, 4 or 6 real and imaginary bits within a symbol (that is, 1, 2 or 3 of each), and then provides bit-wise deinterleaving on a block-based basis. The bit deinterleaving is applied separately to the 2, 4 or 6 sub-streams.

Now the signal is applied to the Viterbi decoder 124. The Viterbi decoder acts as a decoder for the coding introduced by the punctured convolutional coder 36 at the transmitter. The puncturing (when used) has caused the elimination of certain of the transmitted bits, and these are replaced by codes indicating a mid-value between zero and one at the input to the Viterbi decoder. This will be done by giving the bit a minimum likelihood value. If there is no minimum likelihood code exactly between zero and one, then the added bits are alternately given the minimum values for zero and for one. The Viterbi decoder makes use of the soft-decision inputs, that is inputs which represent a likelihood of a zero or of a one, and uses them together with historical information to determine whether the input to the convolutional encoder is more likely to have been a zero or a one.

The signal from the Viterbi decoder is now applied to the outer deinterleaver 126 which is a convolutional deinterleaver operating byte-wise within each packet. The deinterleaver 126 reverses the operation of the outer interleaver 34 at the transmitter. Again this serves to spread any burst errors so that the outer coder 128 can better cope with them.

The outer decoder 128 is a Reed-Solomon decoder, itself well-known, which generates 188-byte packets from the 204-byte packets received. Up to eight random errors per packet can be corrected.

From the Reed-Solomon outer decoder 128 which forms the final element of the error corrector block 120, the signal is applied to an energy dispersal removal stage 130. This receives a pseudo-random binary sequence at an input 132 and uses this to reverse the action of the energy dispersal randomiser 26 at the transmitter. From here the signal passes to an MPEG-2 transport stream demultiplexer 134. A given programme is applied to an MPEG-2 decoder 136; other programmes are separated out as at 138. The MPEG-2 decoder 136 separately decodes the video, audio and data to provide elementary streams at an output 140 corresponding to those at the inputs 12 on FIG. 1.

First Improvement

The first improvement relates to MIMO systems and, as previously noted, may apply to either OFDM or non-OFDM systems. The embodiment may be the DVB system as described above in relation to FIGS. 1, 2 and 3.

The embodiment has a 4-transmit 2-receive (4×2) MIMO structure where two pairs of transmit antennas are fed with the same source data, but distinctly pre-coded by a matrix pair (G,M), and may be used with transmission from satellite, terrestrial or a combination of the two.

One example of implementation of an embodiment is an HD radio camera using a combination of linear and circular polarisation. We observe that circular polarisation on one of the two pairs of antennas, in such systems, is advantageous and suggests this configuration should be considered as a possible 'code' for a 4-by-2 radio camera system. Additionally, if the radio camera receiver is operated with two cross-polar antennas, we have a 4-by-4 MIMO format with simple decoding and a high degree of diversity as well as rate-2 multiplexing.

Referring again to FIG. 1, the embodiment therefore comprises an arrangement as shown, but extended to have 4 transmit antennas arranged in pairs, each pair being fed the same source data. A total of 8 transmission paths exist from the 4 transmit antennas to the 2 receive antennas.

As previously described, a COFDM-MIMO transmission channel can be represented mathematically as a channel matrix H (per COFDM carrier) that operates on the transmitted signal x to yield the received signal y, such that y=Hx+n, where n represents noise.

The embodiment appreciates the fact that improvements may be made to the system using a pre-coding matrices. A pre-coding matrix is a process that may be applied to precode each stream to enhance performance. The pre-coding may be applied as part of the modulator of FIG. 1 or the transmitter front end of FIG. 2. An example pre-coding matrix for the "halfRF" camera is shown below:

$$\begin{bmatrix} z(Tx1) \\ z(Tx2) \\ z(Tx3) \\ z(Tx4) \end{bmatrix} = \begin{bmatrix} 1 & 0 \\ 0 & 1 \\ \frac{1}{\sqrt{2}} & \frac{1}{\sqrt{2}} \\ \frac{j}{\sqrt{2}} & \frac{-j}{\sqrt{2}} \end{bmatrix} \begin{bmatrix} x_{2i}(Tx1) \\ x_{2i+1}(Tx2) \end{bmatrix}$$

$$i = 0, \ldots, (N_{cells}/2) - 1$$

$N_{cells}$ is the number of cells in an error-correcting codeword.

The original two complex values for 2×2 transmission are on the RHS of this equation, and the generated vector z is for transmission over four antennas (two linear cross-polar arrays). The first pair of outputs is an unaltered copy of the input, due to the 2×2 identity matrix in the top half of the 4×2 coding matrix. The lower terms impart circular polarisation to the second pair of outputs.

The improvement derives improved pre-coding matrices. In order to evaluate theoretical performance limits of the system, a channel model or realisation is chosen, appropriate for the RF frequency and the physical environment, where matrix H simulates a per-carrier-pair complex coefficient matrix resulting from obstructions, reflections and any other linear phenomena. Given a particular channel model, we have appreciated that it is possible to introduce a further orthogonal transformation V, resulting in y=HVx+n, that maximises the channel capacity and ensures error free reception even in extremely unfavourable conditions.

One example, in a 4×2 context that increases transmit diversity, is a matrix used to generate two additional circularly polarised outputs. However, even though such a system is less vulnerable to reflections and obstructions, the risk of fading is increased due to destructive interference between the linear and circularly polarised signals. We have appreciated, that this can be alleviated, in this improvement, to a large extent by introducing two pre-coding matrices M, G (to be applied to two cross-polar transmitter outputs).

The arrangement, therefore, has a 4-transmit 2-receive (4×2) MIMO structure where two pairs of transmit antennas are fed with the same source data, but distinctly pre-coded by a matrix pair (G,M).

We therefore have a received signal of the form y=(H₁Mx+H₂Gx)+n

The pre-coding matrices are arranged so as to meet selected conditions. A channel measure is chosen and mapped to a channel realisation so as to model a channel.

In a first variant, the pre-coding matrices satisfy:

$$M,G = arg\max\{\min_\beta\{\log_2 det[I+s(G+\beta M)^H]\}\} \quad (1)$$

where $MM^H = GG^H = I$, $\beta$ is a complex scalar which may be referred to as a complex channel measure and s is a scalar representing linear (power) signal-to-noise ratio. The channel capacity formula within the above equation (the log equation) is based on the known Telatar formula, which may be referred to as the standard formula.

This solution to this expression maximises the minimum MIMO capacity at a given signal-to-noise ratio following a (scalar) addition of the two transmitted outputs. The system outage capacity is hence optimised. Numerical optimisation and simulation showed that a candidate pairing for M and G exists where G is the circularly polarisation pre-coding as before, i.e.

$$G = \frac{1}{\sqrt{2}}\begin{bmatrix} 1 & 1 \\ -j & j \end{bmatrix} \quad (2)$$

and M is the conjugate matrix $$M = \frac{1}{\sqrt{2}}\begin{bmatrix} 1 & 1 \\ j & -j \end{bmatrix} \quad (3)$$

The above approach therefore arrives at two separate pre-coding matrices, one to be applied to source data for one pair of antennas, and the other to be applied to the same source data for a second pair of antennas. More generally, the technique for determining pre-coding matrices may be applied to MIMO systems where an equivalent channel of lower dimensionality than the physical dimensionality is sufficient to describe the equivalent transmit-receive paths. The technique may be applied to MIMO antenna arrangements using linear and/or circular polarisations, such as DVB-NGH or the radio camera arrangement discussed earlier.

Variations of this improvement are possible as noted in the summary of the invention. The first variation is described above. In the second variation, instead of maximising the minimum MIMO capacity, an expectation is calculated as follows. A set of values of a complex channel measure is selected from a probability distribution. The average of the channel capacity over the selected set of values of channel capacity is determined. The precoding matrices that maximimise the average channel capacity are then selected. The average may be the mathematical mean, median or mode. Additionally, a weighted combination of the minimum search implicit in (1) and the expectation-based approach just described may be employed.

Other variations are possible. For example, instead of using the complex channel measure $\beta$ as a 'channel measure', we can cascade two full (partially correlated) channel models with the matrix pair G,M, then sum the output and maximise the average capacity over multiple realisations of the channel models. This technique provides a much closer fit to the 'real-world' case we are ultimately trying to target. The channel models can be chosen from those pertinent to 2 GHz or 7 GHz radio-cameras (BBC models), or the DVB-NGH 4×2 model used during standardisation.

When the matrices G and M have been generated by any of the described approaches, they may be modified by any scalar unit-magnitude complex rotation (i.e. the whole matrix G and M can be scaled by some exp(j Q)) and retain the same performance.

The pre-coding matrices G, M as defined in equations (2) and (3) above, or as derived by variations of the methods of deriving pre-coding matrices, may be used in a method of transmitting a MIMO signal, a transmitter, a method of receiving, a receiver and a MIMO system.

Second Improvement

The second improvement relates to OFDM systems and, as previously noted, may apply to either MIMO or non-MIMO systems. The embodiment may be the DVB system as described above. Preferably, the second improvement is used in combination with the first improvement to produce and improved MIMO-OFDM arrangement for broadcast and radio-cameras of the type already described.

As before, the embodiment has a 4-transmit 2-receive (4×2) MIMO structure where two pairs of transmit antennas are fed with the same source data, but distinctly pre-coded by a matrix pair (G,M), and may be used with transmission from satellite, terrestrial or a combination of the two.

In this improvement a frequency dependent transformation is applied to an OFDM signal. In order to minimize fading, a form of cyclic delay diversity could be used.

$$D(n) = \begin{bmatrix} e^{j\phi(n)} & & & 0 \\ & e^{j\phi(n)} & & \\ & & e^{-j\phi(n)} & \\ 0 & & & e^{-j\phi(n)} \end{bmatrix} \quad (4)$$

$$\phi(n) = \begin{cases} -\pi\left[\left(\frac{n}{N} - 0.5\right)^2 + 0.25\right] & \text{for } 0 \leq n < \frac{N}{2} \\ \pi\left[\left(\frac{n}{N} + 0.5\right)^2 - 0.25\right] & \text{for } -\frac{N}{2} \leq n < 0 \end{cases}$$

where n is the OFDM carrier offset from the centre frequency, and N is the FFT length. Where left blank, the values in the matrix are zero which have been omitted merely for clarity.

As can be seen, opposite phase shifts are applied to the top and bottom pair of transmitters, where the angle follows a quadratic curve. The maximum group delay difference between the two pairs is equivalent to delay of one sample period (at the FFT output), which is entirely sufficient given the small separation between transmitting antennas, and thus should not affect the channel estimator performance in the receiver. The quadratic curve reduces the risk of a flat fade if a distant yet strong reflection delays the top pair of signals by one sample period.

The two transformations (G,M) described thus far (in relation to the first improvement and as used in this improvement) aim to improve diversity across two pairs of transmitters. Unfortunately, this does not exclude the possibility that a low rank channel matrix H could effectively eliminate one of the two components of the original MIMO signal x. Therefore it is preferable to pre-code x and form two new streams, so that each stream contains decodable information from both elements of x. In the unlikely event that the channel matrix H inverts this transformation, consecutive data carriers and consecutive symbols should be pre-coded with different orthogonal matrices P(n,t) drawn from a set of optimal solutions that maximise diversity and reduce outage probability. Hence, to produce an outage it would not be sufficient for the channel H to be low rank, but it would have to vary in frequency and time to invert P(n,t). Here, the pilot carriers are not pre-coded, so any orthogonal transformation P is allowed without affecting channel estimation.

$$P(n, t) = \begin{bmatrix} 1 & 0 \\ 0 & e^{j\alpha(n,t)} \end{bmatrix} \begin{bmatrix} \cos[\theta(n, t)] & \sin[\theta(n, t)] \\ -\sin[\theta(n, t)] & \cos[\theta(n, t)] \end{bmatrix} \begin{bmatrix} 1 & 0 \\ 0 & e^{j\beta(n,t)} \end{bmatrix} \quad (5)$$

$$\alpha(n, t) = 30\frac{\pi}{180}\left(2\left[\left\lfloor\frac{n}{2}\right\rfloor \bmod 2\right] - 1\right)$$

$$\theta(n, t) = 40\frac{\pi}{180}(2[(n + t)\bmod 2] - 1)$$

$$\beta(n, t) = 25\frac{\pi}{180}\left(2\left[\left\lfloor\frac{t}{2}\right\rfloor \bmod 2\right] - 1\right)$$

Thus the final transmitted output becomes $$z = D(n)AP(n,t)x$$

where $$A = \begin{bmatrix} G \\ M \end{bmatrix} \quad (6)$$

An explanation of the MIMO signal processing as provided by equations (5) and (6) is as follows.

The input signal vector x is first processed using matrix P by applying a first carrier index dependent complex rotation of one of the transmit signal pairs using a first complex rotation angle. A real 2×2 rotation matrix then acts across the MIMO pair. Then a second carrier index dependent complex rotation of the one of the transmit signal pairs is performed, using a second complex rotation angle. The complex rotation angles are defined by alpha and beta above and differ from one another. The results of the improved matrix P is then processed using precoding matrices (G, M) which may be as described in relation to the first improvement. Lastly, cyclic delay diversity may be applied according to matrix D.

Although in practice, a single 4×2 transformation M would be used in the transmitter, the structure of matrix D means that a 4-element vector must be produced before the dual IFFT block generates the OFDM symbols. This means that in total a quad IFFT module and four digital up-sampling and up-conversion chains are required. The additional cost in the receiver is limited only to a multiplication of the recovered channel matrix H by P(n,t).

The invention claimed is:

1. A method of processing an OFDM MIMO signal in a system having at least two transmitters arranged to transmit an output signal pair, comprising operating a series of transformations on a pair of input signals so that each stream of the output signal pair contains decodable information from both streams of the input signal pair including:
   a carrier index dependent complex rotation of one signal relative to another using a first complex rotation angle;
   a real 2×2 rotation matrix of a signal pair; and
   a time dependent complex rotation of one signal relative to another, using a second complex rotation angle, wherein the second complex rotation angle is different from the first complex rotation angle.

2. A method of processing an OFDM MIMO signal according to claim 1, further comprising applying precoding matrices (G, M), one to be applied to source data for one pair of antennas, and the other to be applied to the same source data for a second pair of antennas.

3. A method of processing an OFDM MIMO signal according to claim 1, further comprising applying cyclic diversity delay as a function of carrier index.

4. A method of transmitting a MIMO signal according to claim 1, wherein the MIMO signal is of the type having fewer data streams than output antennas.

5. A method of transmitting a MIMO signal according to claim 4, wherein the MIMO signal uses two separate pre-coding matrices, one to be applied to source data for one pair of antennas, and the other to be applied to the same source data for a second pair of antennas.

6. A method of transmitting a MIMO signal according to claim 4, wherein the MIMO signal is to be applied to an antenna arrangement using linear and/or circular polarisations.

7. A method of transmitting a MIMO signal according to claim 4, wherein the MIMO signal is to be applied to an antenna arrangement using linear and/or circular polarisations.

8. A method of transmitting a MIMO signal according to claim 4, wherein the MIMO signal is for an arrangement having a 4-transmit 2-receive (4×2) MIMO structure where two pairs of transmit antennas are fed with the same source data, but distinctly pre-coded by a matrix pair (G,M).

9. A method of transmitting a MIMO signal according to claim 4, comprising using a matrix pair defined as $$G = \frac{1}{\sqrt{2}}\begin{bmatrix} 1 & 1 \\ -j & j \end{bmatrix},$$

and $$M = \frac{1}{\sqrt{2}}\begin{bmatrix} 1 & 1 \\ j & -j \end{bmatrix},$$

wherein G is a circularly polarisation pre-coding and M is a conjugate matrix.

* * * * *